United States Patent Office 3,556,743
Patented Jan. 19, 1971

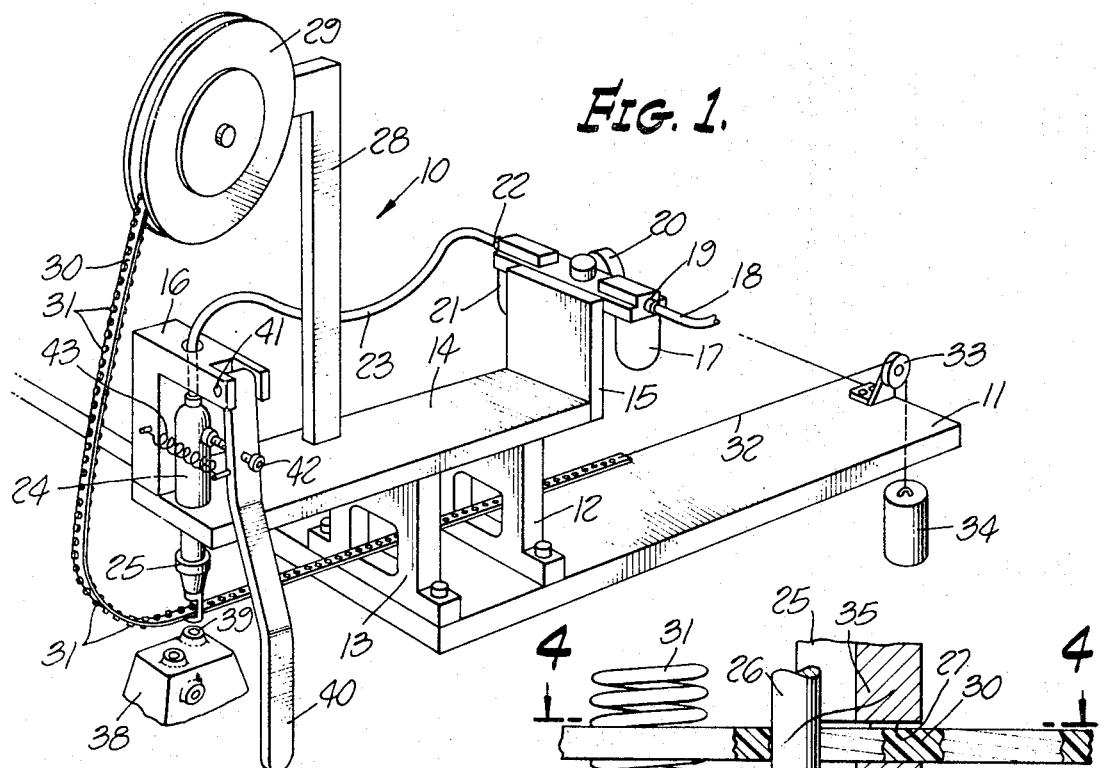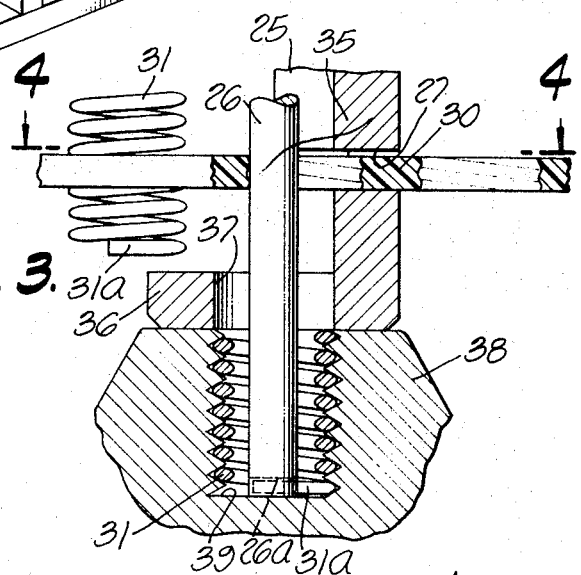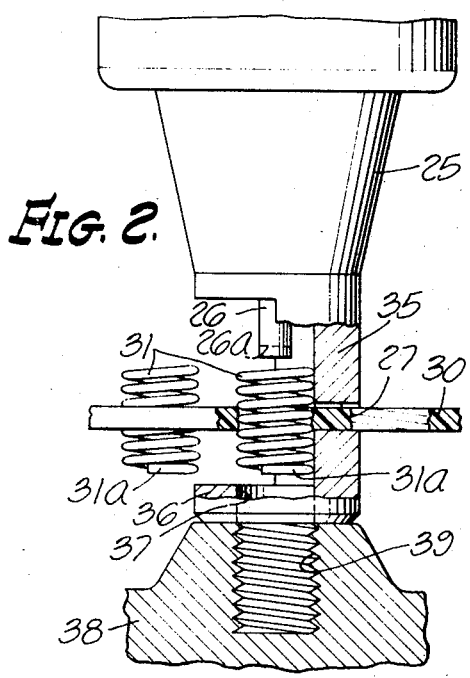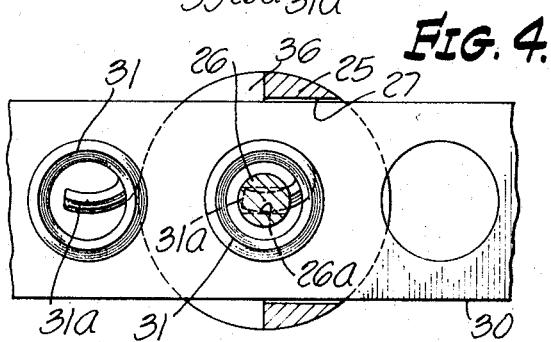

3,556,743
METHOD AND APPARATUS FOR INSTALLING THREAD INSERTS
Paul Allen Yeager, Lynwood, Calif., assignor to Sabema Corporation, Gardena, Calif., a corporation of California
Filed Dec. 23, 1968, Ser. No. 786,311
Int. Cl. B23p *19/00, 19/04;* B23q *7/10*
U.S. Cl. 29—429                                            11 Claims

ABSTRACT OF THE DISCLOSURE

An apparatus rotatably supports a reel of tape in which a plurality of metal thread inserts are releasably mounted in series. The tape is fed past a rigidly supported power tool which operably engages the inserts and screws the inserts into threaded holes on a workpiece manually supported and positioned to receive the insert.

---

This invention relates to a method and an apparatus for placing thread inserts into threaded holes in a workpiece.

When working with a soft metal, such as aluminum or magnesium alloys, it has been found to be undesirable to directly connect the external threads of a screw or bolt to internal threads formed in an opening or hole in the soft metal. Such a direct connection frequently leads to damage to the internal threads of the soft metal. One solution to this problem is to insert into the threaded hole a hard metal helical coil insert and then threadably connect the screw or bolt to the insert. However, the operation of installing the coil inserts into the threaded hole is a very time consuming operation because care must be taken not to damage the soft internal threads in the hole when inserting the coil insert, and also the depth of insertion of the coil insert must be closely controlled.

Therefore, it is an object of this invention to provide a method and apparatus for the insertion of helically wound metal coil inserts into threaded holes or openings in a workpiece. In accordance with the object, each insert is automatically positioned for insertion into the threaded hole and the insertion is accomplished by a power driven tool which engages each insert in turn and screw threads it into an aligned threaded hole in the manually supported and positioned workpiece.

It is also an object of this apparatus and process to control the depth of insertion of the insert into the threaded hole.

Other and further objects of this invention will be made apparent from the following description and accompanying drawings.

IN THE DRAWINGS

FIG. 1 is a perspective view of the apparatus for inserting the metal inserts into the threaded openings of a workpiece.

FIG. 2 is a side elevation partially in section showing one insert positioned for insertion into the threaded opening.

FIG. 3 is a side elevation partially in section showing an insert in place in the threaded opening.

FIG. 4 is a view partially in section taken along the line 4—4 of FIG. 3.

Briefly, the invention includes a rigidly supported power tool for engaging coil inserts and screwing the inserts into threaded holes in a workpiece. The inserts are releasably carried on a flexible tape which is wound on a rotatably supported reel. The tape is fed from the reel to the tool and each insert is automatically positioned for insertion by the tool into a threaded opening. Means are provided to actuate the power tool after the workpiece has been manually manipulated to align the threaded hole and insert for insertion.

Referring now to the drawings, the apparatus for inserting the coil inserts, generally designated 10, as seen in FIG. 1 is connected to a work bench 11. The apparatus 10 includes a pair of vertical support members 12 and 13 which are secured to the work bench 11. Mounted on the vertical support members 12 and 13 is a horizontal base 14 which has an upwardly extending rear bracket member 15 at one end and an upwardly extending front bracket member 16 at the other end. The rear bracket 15 supports an air filter 17 which receives an air hose 18 at the inlet port 19. The air from the air hose 18 passes first through the air filter 17 into a pressure regulator 20 and then through a lubricator 21, both of which are supported on the rear bracket member 15. The air then passes from the lubricator 21 through an inlet port 22 into a conduit line 23. The conduit line 23 communicates the air into an air driven rotary tool or motor 24. The air motor 24 is rigidly supported on the horizontal base 14 and includes a stationary adaptor 25 located at its lower end and a mandrel 26 which is rotated and moved axially by the air motor 24.

A vertical arm 28 also secured to the horizontal base 14 rotatably supports a reel 29. The reel 29 contains a flexible tape 30 which carries a plurality of metal helically wound coil inserts 31. The coil inserts 31 are adapted to pass into an aligned position for operable engagement with the mandrel 26. A tang 31a formed integrally with the lower end of the insert 31 is engaged by the slot 26a on the lower end of the mandrel 26.

A desired tension on the tape 30 is maintained by connecting the end of the tape 30 to a line 32 which passes over a pulley member 33 and is then attached to a weight 34. The weight 34 acts on the line 32 to pull the tape through a sloted opening 27 in the vertical wall 35 on the adaptor 25 for purposes of feeding the inserts 31 into the power tool 24. The slot 27 is proportioned such that it will not pass the inserts 31 and the wall 35 acts to hold and align the coil inserts 31 in the proper position for engagement by the mandrel 26. The horizontal wall 36 on the adaptor 25 has an opening 37 sized to pass the coil inserts 31 when driven vertically downward by the mandrel 26 and free of the tape 30. It should be recognized that the feeding of the tape 30 and inserts 31 can also be accomplished by other means including a spring or electric motor with an appropriate clutch driven take-up reel.

A metal component or workpiece 38, normally formed from a soft metal, such as magnesium or aluminum, includes a plurality of internally threaded openings or holes 39 which receive the coil inserts 31.

An air valve lever 40 is pivotally connected at 41 to the front bracket member 16 and extends vertically downward for manual engagement by the leg or hand of an operator. The air valve lever 40 actuates the air motor valve by means of a pin member 42 which extends into the air motor 24 and is connected to the lever 40. A spring member 43 positioned between the front bracket member 16 and the lever 40 returns the lever to its original position when pressure at the lower end of the lever 40 exerted by the operator is released. The actuation of the air motor can also be accomplished electrically or pneumatically.

The operation of the apparatus is as follows: The tape 30 is fed from the reel 29 through an elongated slot 27 in the vertical wall 35 of the adaptor 25. Tension is applied to the end of the tape 30 to effect horizontal movement of the tape through the elongated slot. Continued movement of the tape through the slot 27 is prevented by the engagement between a coil insert 31 and the vertical wall 35. Once an insert 31 is in contact with the vertical wall 35 it is in proper alignment for engagement with the mandrel 26 and movement through the opening 37 in the horizontal wall 36 of the adaptor 25. The piece 38 is then manually supported and moved unitl it rests against the lower side of the horizontal wall 36 and the internally threaded opening 39 is in proper alignment with the opening 37 to receive the coil insert 31. The seated operator who is manually positioning the workpiece 38 then actuates the air valve lever with his knee to energize the air motor 24, thereby causing the mandrel 26 to rotate and to advance axially. The slotted end 26a of the mandrel 26 engages the tang 31a on the insert 31 and moves the coil insert vertically downward free of the tape 30 through the opening 37 and at the same time rotating the coil insert 31 so as to screw it into the internal threaded opening 39 in the workpiece 38. Once the coil insert 31 has been inserted into the threaded opening 39 to the desired depth the air motor automatically reverses and the mandrel disengages from the coil insert 31 and returns vertically upward to the starting position as shown in FIG. 2. The force acting on the tape then automatically pulls an additional portion of the tape 30 now free of an insert 31 through the elongated slot 27 until the next succeeding insert 31 engages the vertical wall 35. The workpiece is then manually repositioned and the operation repeated.

Having fully described my invention, it is to be understood that I am not to be limited to the details herein set forth, but that my invention is of the full scope of the appended claims.

I claim:
1. A device for installing thread inserts into threaded openings on a manually supported and positioned workpiece, comprising:
   a flexible tape for releasably carrying the inserts;
   a rotatably supported reel for storing said tape;
   a rigidly supported power tool to operably engage and screw thread the inserts from said tape into the threaded openings;
   means to feed the inserts on said tape from said reel to said power tool;
   means on said power tool to align the inserts for operable engagement with said power tool; and
   means to actuate said power tool whereby said power tool operably engages and screw threads an aligned insert into a threaded opening in the manually supported and positioned workpiece.
2. The device of claim 1, wherein said feed means includes a weight operably connected to one end of said tape and adapted to pull said tape from said reel through said power tool.
3. The device of claim 1, wherein said power tool comprises an air operated motor, an adaptor to align the inserts, and a driving mandrel to operably engage and screw thread the aligned inserts into threaded openings.
4. The device of claim 3, wherein said adaptor includes a vertical wall having a slotted opening, said vertical wall to engage and align the inserts with said mandrel, and said slotted opening to pass said tape free of the inserts.
5. The device of claim 3, wherein said adaptor includes a horizontal wall having an opening, said horizontal wall to position and contact the manually supported workpiece, and said opening sized to pass the insert driven vertically downward by said mandrel.
6. The device of claim 1, wherein a frame rigidly connected to a workbench supports said reel and said power tool.
7. A device for installing thread inserts releasably carried in a flexible tape into threaded holes in a workpiece which is manually positioned and supported, comprising:
   a frame;
   a reel rotatably supported on said frame for storing the flexible tape;
   a power tool rigidly supported on said frame to screw thread the inserts from the flexible tape into the threaded holes;
   said power tool including an air operated motor, a mandrel driven by said motor being adapted to operably engage an insert, and an adaptor to receive the flexible tape and align an insert with said mandrel;
   said adaptor having a slotted opening to pass the flexible tape free of the inserts and having an opening to pass the inserts driven vertically downward by said mandrel from the tape;
   means operably connected to one end of the flexible tape to pull the tape through said slotted opening and the inserts on the tape against said adaptor; and
   means to actuate said air motor.
8. A method of installing thread inserts into threaded openings on a workpiece, the steps comprising:
   rigidly supporting a power driven installing tool;
   feeding a tape which releasably carries the inserts to the installing tool;
   manually positioning and supporting the workpiece to receive the insert; and
   actuating the installing tool to drive the inserts vertically downward into the threaded opening in the manually positioned workpiece.
9. The method of claim 8, wherein each insert is automatically aligned for operable engagement with the installing tool.
10. The method of claim 8, wherein tension is applied to one end of the tape to feed the tape carrying the inserts to the installing tool and to pull the insert free tape past the installing tool.
11. A method for inserting a helically wound metal insert into a threaded hole in a workpiece, the steps comprising:
   carrying a plurality of inserts in series on a flexible tape;
   storing the tape on a rotatably supported reel;
   rigidly supporting a power tool which is adapted to engage and screw thread an insert into the threaded hole;
   feeding the tape carrying the inserts to the power tool from the reel;
   positioning an insert on the tape for engagement with the power tool;
   manually supporting and positioning the workpiece to properly align the threaded hole to receive an insert; and
   actuating the power tool to engage the aligned insert whereby the insert is screw threaded from the tape into the threaded hole.

References Cited
UNITED STATES PATENTS

| | | | |
|---|---|---|---|
| 2,855,661 | 10/1958 | Forster | 29—240.5 |
| 3,020,630 | 2/1962 | Weinstein | 29—211 |
| 3,378,907 | 4/1968 | Dixon | 29—211X |

THOMAS H. EAGER, Primary Examiner

U.S. Cl. X.R.

29—211, 240.5